US006738266B2

United States Patent

(12) United States Patent
Hosotani et al.

(10) Patent No.: US 6,738,266 B2
(45) Date of Patent: May 18, 2004

(54) SWITCHING POWER SUPPLY UNIT

(75) Inventors: Tatsuya Hosotani, Muko (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/347,303

(22) Filed: Jan. 21, 2003

(65) Prior Publication Data

US 2003/0142514 A1 Jul. 31, 2003

(30) Foreign Application Priority Data

Jan. 25, 2002 (JP) ....................................... 2002-017397

(51) Int. Cl.[7] ................................................ H02M 3/335
(52) U.S. Cl. ....................................... 363/16; 363/56.01
(58) Field of Search ........................ 363/16, 123, 21.02, 363/40, 56.01, 21.15

(56) References Cited

U.S. PATENT DOCUMENTS 6,469,913 B2 * 10/2002 Hosotani et al. .............. 363/16
6,563,720 B2 * 5/2003 Kitano .................... 363/21.15
6,577,511 B2 * 6/2003 Yamaguchi et al. ..... 363/21.07

FOREIGN PATENT DOCUMENTS

| JP | 11-187664 | 7/1989 |
|---|---|---|
| JP | 2000-350449 | 12/2000 |

* cited by examiner

*Primary Examiner*—Shawn Riley
(74) *Attorney, Agent, or Firm*—Keating & Bennett, LLP

(57) ABSTRACT

A switching power supply unit includes a first switching control circuit, which has a first ON-time control circuit, and a second switching control circuit, which has a second ON-time control terminal. The first ON-time control circuit controls the ON-time of the first switching element such that, at light load, before a voltage generated across a first drive winding causes a first switching element to be turned on, a first control transistor is brought into conduction to prevent the first switching element from being turned on and to thereby stop oscillation. The second ON-time control circuit controls the ON-time of the second switching element such that, at light load, after the end of the ON-time of the second switching element, energy release from a secondary winding is completed.

20 Claims, 14 Drawing Sheets

SWITCHING POWER SUPPLY UNIT

BACKGROUND OF THE INVENTION

1. Field of the Invention

The present invention relates to switching power supply units, and more particularly, to a self-excited-oscillation resonance-type switching power supply unit that allows for power saving during a light load condition (during standby).

2. Description of the Related Art

A resonance-type switching power supply unit is disclosed in, for example, Japanese Unexamined Patent Application Publication No. 11-187664.

This power supply unit performs a soft-switching operation, and thus achieves a zero-voltage switching operation by alternately turning on and off two switching elements. This can significantly reduce switching loss, which can achieve high efficiency at rated load. FIG. 10 is a circuit diagram of the power supply unit of the related art.

In this power supply unit, switching elements Q1 and Q2 are turned on at zero voltage and the switching element Q2 is turned off at near zero current, thereby reducing switching loss significantly. A secondary-side rectifying element Ds is turned on at zero current. Concurrently, the waveform of current therein exhibits a relatively sharp rise from zero current, reaches a peak point at which the rate of current change becomes zero, and returns to a point of zero current, thereby turning off the rectifying element Ds. Thus, the waveform of current flowing through the rectifying element Ds becomes a substantially rectangular shape, so that the peak current value can be kept low and the effective value of current can be reduced, thereby reducing conduction loss. Thus, these effects lead to a high efficiency operation.

Meanwhile, a switching power supply unit that is adapted to perform an intermittent oscillation operation at light load is disclosed in Japanese Unexamined Patent Application Publication No. 2000-350449.

This power supply unit is a one-switching-element type switching power supply unit, which is commonly called a "ringing choke converter", and can achieve high efficiency by performing an intermittent oscillation at light load. FIG. 13 is a circuit diagram of the power supply unit of the related art.

The above-described power supply units of the related art, however, have the following problems.

FIG. 11 is a waveform diagram illustrating operations, at light load, of the switching power supply unit disclosed in Japanese Unexamined Patent Application Publication No. 11-187664. Referring to FIG. 11, reference symbols S1 and S2 indicate signals representing ON and OFF states of the switching elements Q1 and Q2, respectively; reference symbol Vds1 indicates the waveform of a voltage across a capacitor C1; and reference symbol Id1 indicates the waveform of a current flowing in the switching element Q1.

As shown, when the ON-time of the switching element Q2 is substantially constant regardless of the load condition, energy stored in the transformer is partially regenerated into input power at light load. Thus, this switching power supply unit has a problem in that the circulating current is increased and the efficiency is reduced due to conduction loss. In FIG. 11, shaded areas represent regenerative current.

FIG. 12 is a waveform diagram illustrating operations when the ON-time of the switching element Q2 is designed to be short at light load to decrease the circulating current. However, in this case, while the switching elements Q1 and Q2 perform a zero-voltage switching operation, there is a problem in that the efficiency is reduced, for example, since switching loss is increased in a drive circuit due to an increase in switching frequency.

This power supply unit can control the ON-time of the second switching element to be shorter than the ON-time at rated load (see FIG. 12) to reduce conduction loss at light load. Yet, the timing (turn-off timing) at which the ON-time of the second switching element ends is not set to a timing at which energy release from the secondary winding ends or is earlier than that timing. In other words, even when energy release from the secondary winding ends, the ON-time of the second switching element still continues. As a result, when the second switching element is turned off, current flows through a diode that is connected in parallel with the first switching element. This state is equal to a state in which the first switching element is virtually in a conduction state, which means that the first switching element cannot be turned off. This prevents the operation of the first switching control circuit from proceeding to an intermittent oscillation mode, which will be described later.

FIG. 14 is a waveform diagram illustrating operations, at light load, of the switching power supply unit disclosed in Japanese Unexamined Patent Application Publication No. 2000-350449. Referring to FIG. 14, reference symbol S1 indicates a signal representing ON and OFF states of a switching element Q1, Vds1 indicates the waveform of a voltage across the switching element Q1, and Id1 indicates the waveform of current in the switching element Q1.

As shown, when intermittent oscillation is performed at light load, a large switching surge voltage is generated during intermittent oscillation. As a result, a high voltage switching is required, which can inhibit high efficiency. Additionally, the switching power supply unit has a problem in that an electronic apparatus that is connected thereto malfunctions due to a large output voltage ripple, thus requiring a filter circuit for removing the output voltage ripple.

In addition, the switching power supply unit has difficulty in achieving high efficiency due to switching loss, compared to a soft-switching power supply unit.

SUMMARY OF THE INVENTION

In order to overcome the problems described above, preferred embodiments of the present invention provide a self-excited-oscillation switching power supply unit that has a simple configuration with fewer components than conventional devices and that achieves high efficiency at light load, in such a manner that the operational modes are changed by adequately changing, at light load and at rated or heavy load, a time constant for determining the ON-time of ON-time control circuits in switching control circuits for controlling the ON and OFF operations of switching elements, and an intermittent oscillation operation is performed at light load.

According to a preferred embodiment of the present invention, a two-switching-element-type switching power supply unit includes a first switching control circuit and a second switching control circuit which have novel configurations.

Specifically, the second switching control circuit is preferably configured as follows.

The second switching control circuit includes a second On-time control circuit. At light load, the second ON-time control circuit controls the ON-time of a second switching element such that the ON-time of the second switching element becomes shorter that the ON-time at rated load and energy release from a secondary winding is completed after the ON-time of the second switching element ends.

According to a preferred embodiment of the present invention, at light load, the second ON-time control circuit controls the ON-time of the second switching element such that the energy release from the secondary winding is completed after the end of the ON-time of the second switching element. Also, before a voltage generated across the first drive winding causes the first switching element to be turned on, a first impedance circuit causes a first control transistor to go into conduction, to prevent the first switching element from being turned on and to thereby stop the switching operation. This allows for intermittent oscillation at light load, which has not been achieved by a two-switching-element self-excited-oscillation type switching power supply unit of the related art, by adding a small number of components.

According to preferred embodiments of the present invention, unlike the power supply unit disclosed in Japanese Patent Application Publication No. 11-187664, the second switching element is turned on before energy release from the secondary winding ends.

Thus, the power supply unit of preferred embodiments of the present invention can significantly reduce conduction loss and switching loss at light load and can perform a high-efficiency operation.

Also, the first switching control circuit is preferably configured as follows.

The first switching control circuit includes a first ON-time control circuit. When the output voltage reaches a predetermined value at light load, the first ON-time control circuit prevents a voltage generated across the first drive winding from turning on the first switching element to thereby stop oscillation. At rated or heavy load, the first ON-time control circuit allows a voltage generated across the first drive winding to turn on the first switching element, thereby controlling the ON-time of the first switching element.

At rated or heavy load, as for the first switching element to be turned on due to a voltage generated across the first drive winding, the first control transistor is driven to turn on the first switching element. This operation is analogous to the operation of the circuit of the related art.

At light load, a second ON-time control circuit changes the ON-time of the second switching element, to cause the energy release to continue at a turning-off timing of the second switching element. Further, after the energy release ends, no current flows through a rectifying element for the secondary-side winding, and when a reverse voltage is generated across the transformer, no current flows through the diode that is connected in parallel with the first switching element. At this point, causing the first switching element to be in the OFF state can turn the first switching circuit into a non-conduction state, thereby allowing the first switching control circuit to control an intermittent oscillation operation.

In contrast, with the circuit of the related art described above, when the second switching element is turned off and a reverse voltage is generated across the transformer, the first switching circuit cannot be brought into a non-conduction state since the diode, which is connected in parallel with the first switching element, goes into conduction. Thus, the circuit of the related art cannot control an intermittent oscillation operation.

An intermittent oscillation operation performs the following operation.

When the output voltage reaches a predetermined value due to an oscillation operation, before the first switching element is turned on due to a voltage generated across the first drive winding, the first control transistor is brought into conduction, to prevent the first switching element from being turned on and to thereby stop oscillation. The stopping of oscillation causes the output voltage to decrease, and when the output voltage reaches a predetermined value or less, a voltage is supplied to a control terminal of the first switching element via a start-up resistor, thereby starting oscillation. Repeating that operation cyclically provides an intermittent oscillation operation. The first switching control circuit includes the first ON-time control circuit that performs such operation at light load.

With the operation described above, a two switching-element self-excited-oscillation type switching power supply unit can perform an intermittent oscillation operation at light load.

In addition, a switching surge voltage is clamped during intermittent oscillation. Thus, low-voltage switching elements can be used to reduce conduction loss, which thus can achieve low loss.

Preferred embodiments of the present invention further provide the following configurations.

Preferably, the switching power supply unit according to a preferred embodiment of the present invention includes an output-voltage stabilization circuit. The output-voltage stabilization circuit detects the output voltage and, in response to the detected voltage, feeds back a signal for changing the impedance of the first impedance circuit by using a photocoupler, thereby stabilizing the output voltage.

Preferably, the output-voltage stabilization circuit is provided with a gain adjustment circuit. The photocoupler is constituted by a photodiode and is connected series with a resistor, and the gain adjustment circuit reduces the resistance of the resistor to increases a feedback gain of the photocoupler.

Preferably, the gain adjustment circuit is provided to allow for a significant reduction in output ripple voltage, which has been increased with a power supply unit of the related art.

During continuous oscillation of the switching power supply circuit, an output ripple voltage is small due to the absence of a non-oscillation period. Meanwhile, during an intermittent switching operation, the output voltage increases in an oscillation period and decreases in a non-oscillation period, which poses a problem in that ripple in the output voltage becomes large in an intermittent oscillation cycle.

Accordingly, in preferred embodiments of the present invention, a change in current flowing through the photodiode is increased during intermittent oscillation to cause the gain to increase. This can reduce and minimize the ripple voltage because of the improved sensitivity such that the ripple voltage is a very small fluctuation in output voltage.

Other preferred embodiments of the present invention further provide the following configurations.

Preferably, the switching power supply unit according to a preferred embodiment of the present invention may include a peak-current limit circuit. The peak-current limit circuit has a current detecting device that is connected in series with the first switching element. The current detecting device detects primary winding current that flows through the first switching element, and the peak-current limit circuit turns off the first switching element when the primary winding current reaches a current peak value.

With this arrangement, even when the primary winding current is increased, the peak current value is limited to prevent saturation in the transformer. Additionally, a reduction in current peak value allows for a reduction in switching loss when the first switching element is turned off. Further, the number of oscillation pulses in an oscillation period is increased to cause the cycle of an intermittent oscillation to be shortened, thereby allowing for a reduction in ripple voltage.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
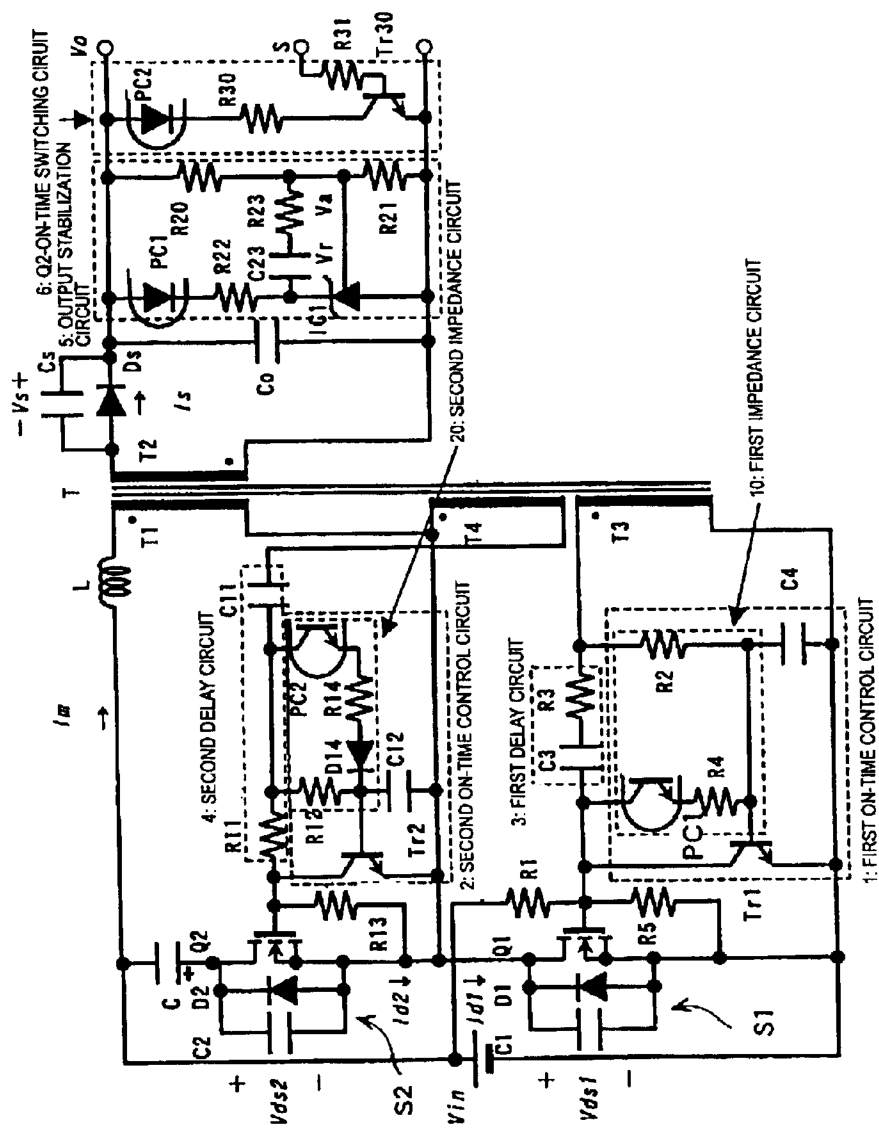
FIG. 1 is a circuit diagram of a first preferred embodiment of the present invention.

FIG. 1 is a circuit diagram of a switching power supply unit according to a first preferred embodiment of the present invention.

A first switching circuit S1 includes a first switching element Q1, a first diode D1, and a first capacitor C1, which are connected in parallel with each other. A second switching circuit S2 includes a second switching element Q2, a second diode D2, and a second capacitor C2, which are connected in parallel with each other. The first switching circuit S1, a primary winding T1 of a transformer T, and an input power supply Vin are connected in series with each other. A series circuit including the second switching circuit S2 and a capacitor C is connected in parallel with the primary winding T1 of the transformer T.

In this preferred embodiment, field effect transistors may be used for the first and second switching elements Q1 and Q2.

A first drive winding T3 of the transformer T generates a voltage, which is substantially proportional to a voltage across the primary winding T1 and which is input to a first switching control circuit. The first switching control circuit is constituted by a first delay circuit 3, a first control transistor Tr1 for turning off the first switching element Q1, and a time-constant circuit. The first delay circuit 3 includes a capacitor C3 and a resistor R3, which are connected in series between the first drive winding T3 and a control terminal (gate) of the switching element Q1. The time-constant circuit includes a resistor R4 and a phototransistor PC1, which are connected in series, a resistor R2, and a capacitor C4. The phototransistor PC1 receives a feedback signal from an output stabilization circuit 5. The time-constant circuit is connected to a control terminal (base) of the transistor Tr1. The transistor Tr1, the phototransistor PC1, the resistor R4, the resistor R2, and the capacitor C4 constitute a first ON-time control circuit 1. The resistors R2 and R4 and the phototransistor PC1 constitute a first impedance circuit 10.

A second drive winding T4 of the transformer T generates a voltage having a polarity that is opposite to a voltage across the first drive winding T3, the voltage of which being substantially proportional to a voltage across the primary winding T1, and the voltage from the drive winding T4 is input to a second switching control circuit. The second switching control circuit is constituted by the second delay circuit 4, a second control transistor Tr2 for turning off the second switching element Q2, and a time constant circuit. The second delay circuit 4 includes a capacitor C11 and a resistor R11, which are connected in series between the second drive winding T4 and a control terminal (gate) of the switching element Q2. The time-constant circuit includes a phototransistor PC2, a resistor R14, and a diode R14, which are connected in series, a resistor R12, and a capacitor C12. The phototransistor PC2 receives a feedback signal from a Q2-ON-time switching circuit 6. The time-constant circuit is connected to a control terminal (base) of the transistor Tr2. The transistor Tr2, the resistor R12, the capacitor C12, the phototransistor PC2, the resistor R14, and the diode D14 constitute a second ON-time control circuit 2. The resistors R12 and R14, the phototransistor PC2, and the diode D14 constitute a second impedance circuit 20.

A start-up resistor R1 is connected between the input power supply Vin and the control terminal (gate) of the first switching element Q1.

A secondary winding T2 of the transformer T is connected to a rectifying element Ds, which is connected in parallel with a capacitor Cs. The output of the rectifying element Ds is connected to a smoothing capacitor Co, the output stabilization circuit 5, and the Q2-ON-time switching circuit 6.

The output stabilization circuit 5 preferably includes output voltage detection resistors R20 and R21, a shunt regulator IC1 having a reference-voltage input terminal Vr, to which a voltage division point Va of the resistors R20 and R21 is connected, a photodiode PC1 which is connected in series with the shunt regulator IC1, and a resistor R22. The shunt regulator IC1 controls current between the cathode and the anode so that a voltage at the reference-voltage input terminal Vr becomes constant. A change in the current is converted into a light intensity of the photodiode PC1 and the resulting light enters the phototransistor PC1 that is included in the first impedance circuit. In this circuit, in accordance with the magnitude of current flowing through the photodiode PC1, the ON-timing of the first control transistor Tr1 is controlled via the phototransistor PC1, and consequently, the ON-time of the first switching element Q1 is controlled. That is, when current flowing through the photodiode PC1 starts to increase due to an increased output voltage, the ON-time of the first switching element Q1 is reduced to cause the output voltage to be reduced. Conversely, when current flowing through the photodiode PC1 starts to decrease due to a reduced output voltage, the ON-time of the first switching element Q1 is increased to cause the output voltage to be increased. This operation can provide a stabilized output voltage.

The Q2-ON-time switching circuit 6 includes a photodiode PC2, and a resistor R30 and a transistor Tr30, which are connected in series with the photodiode PC2, and a resistor R31, which is connected to a control terminal (base) of the transistor Tr30. The resistor R31 is connected to a light-load-time signal input terminal S. A signal is externally input to the terminal S at light load.

When a signal is input to the terminal S at light load, the transistor Tr30 is turned on and current in the photodiode PC2 increases. As a result, current in the phototransistor PC2, which is optically coupled with the photodiode PC2, in the second impedance circuit 20 increases, thereby making the ON-timing of the transistor Tr2 faster. As described below, with this circuit, at light load, the ON-time of the second switching element Q2 becomes shorter than the ON-time at rated load, so that the energy emission from the secondary winding is completed after the ON-time of the second switching element Q2 ends. Thus, the second impedance circuit 20 varies in time constant to operate as described above, at light load and rated or heavy load.

The operation of the switching power supply unit will now be described.

(1) At Rated or Heavy Load

Figure 2:
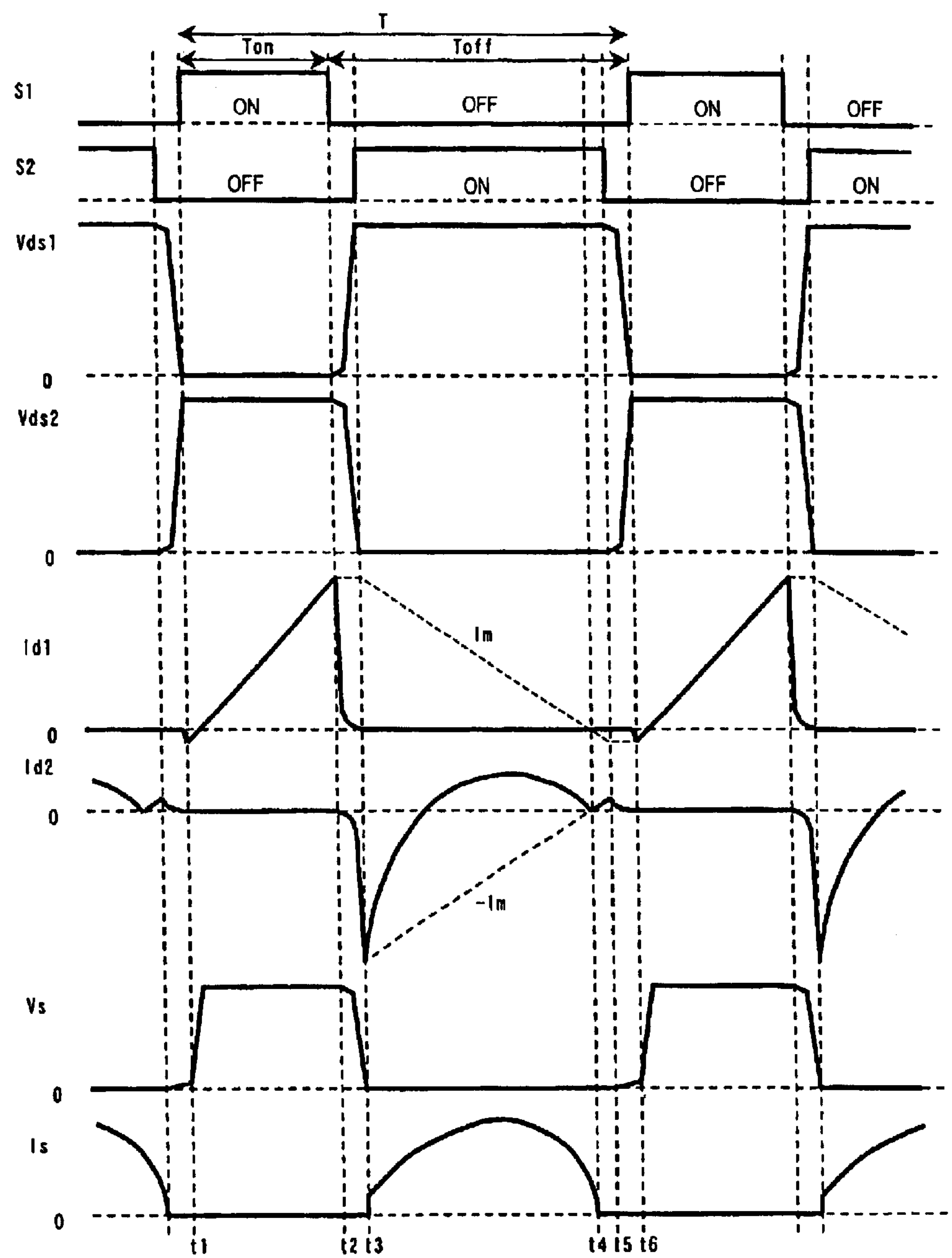
FIG. 2 is a waveform diagram illustrating operations at rated load.

FIG. 2 is a waveform diagram illustrating operations of the switching power supply unit at rated load.

In FIG. 2, reference symbols S1 and S2 indicate signals representing the ON and OFF of the switching elements Q1 and Q2, respectively; reference symbols Vds1, Vds2, and Vs indicate the waveforms of voltage signals across the capacitors C1, C2, and Cs, respectively; and reference symbols Id1, Id2, and Is indicate the waveforms of current signals across the switching circuit S1 and S2 and the rectifying element Ds, respectively.

With respect to the switching operation of this circuit after starting-up, one switching cycle T is divided into five operational states, i.e., time t1 to t6. First, the start up (the starting of oscillation) will be described, and then individual states will be discussed.

During start-up, when an input power supply Vin is applied to the start-up resistor R1, the start-up resistor R1 brings the switching element Q1 into the ON state.

The five operational states of time t1 to t6 in one switching cycle T, in an optimum rated condition starting from the ON state of the switching element Q1, will now be described below.

In state 1 (time t1 to t2), a voltage generated across the drive winding T3 is applied to the control terminal of the first switching element Q1 to turn on the first switching element Q1, and an input voltage is applied to the primary winding T1 of the transformer T to cause current in the primary winding T1 of the transformer T to increase linearly, so that excitation energy is stored in the transformer T. During this period, the capacitor C4 is charged via the phototransistor PC1 and the resistor R4, and at time t2, a voltage across the capacitor C4 reaches a threshold voltage (for example, about 0.6 V) of the transistor Tr1. The transistor Tr1 is then turned on, the first switching element Q1 is turned off, and the cycle proceeds to state 2.

In state 2 (time t2 to t3), when the switching element Q1 is turned off, the primary winding T1 of the transformer T and an inductor L resonate with the capacitors C1 and C2, so that the capacitor C1 is charged and the capacitor C2 is discharged. Also, at the secondary side, the secondary winding T2 of the transformer T and the capacitor Cs resonate with each other, so that the capacitor Cs is discharged. The curve of the rising edge of voltage signal Vds1 is part of a sine wave resulting from the resonance of the capacitors C1 and C2 with the inductor L and the inductor of the primary winding T1. The falling edge of current signal Id1 has a waveform that has a phase which advances from voltage signal Vds1 by 90 degrees. The curve of the falling edge of voltage signal Vds2 is part of a sine wave resulting from the resonance of the capacitors C1 and C2 with the inductor L and the inductor of the primary winding T1. The falling edge of voltage signal Id2 has a waveform that has a phase which advances from voltage signal Vds2 by 90 degrees. During this period, at the secondary side, voltage Vs across the capacitor Cs drops to zero voltage to bring the rectifying element Ds into conduction, thereby performing a zero-voltage turn-on operation. The curve of the falling edge of voltage Vs is part of a sine wave resulting from the resonance of the capacitor Cs and the inductor of the secondary winding T2. When voltage Vds2 across the capacitor C2 drops to zero voltage, the diode D2 goes into conduction. At this point, the second delay circuit 4, which includes the capacitor C11 and the resistor R11, causes a voltage generated across the drive winding T4 to be applied to the control terminal of the switching element Q2 with a short delay from the voltage generation, so that the switching element Q2 is turned on. This causes a zero-voltage switching operation, and the cycle proceeds to state 3.

In state 3 (time t3 to t4), the diode D2 or the switching element Q2 goes into conduction, and the inductor L and the capacitor C resonate with each other. At this point, at the secondary side, the rectifying element Ds goes into conduction, and the excitation energy stored in the transformer T is released from the secondary winding T2 and is output through a rectifying/smoothing circuit. In this case, the waveform of current Is that flows to the rectifying element Ds becomes similar to the waveform of a combination of current Id2, which results from the resonance of the inductor L and the capacitor C of the primary side, and excitation current Im that decreases linearly. Thus, current Is sharply rises from zero current due to an effect of the capacitor Cs, and thus exhibits a waveform having a sine-wave curve. Also, current Is reaches a peak point at which the rate of current change becomes zero and then decreases toward zero current. At time t4, excitation current Im in the transformer and current Id2 exhibits the relationship of –Im=Id2, and when current Is at the secondary side becomes zero, the rectifying element Ds is turned off. As a result, the rectifying element Ds performs a zero current turn-off operation, and the cycle proceeds to state 3.

In state 4 (time t4 to t5), in response to the turning off of the rectifying element Ds, at the primary side, the resonance of the capacitor C and the inductor L ends, and only excitation current Im flows therein due to the discharge of the capacitor C, so that the transformer T is excited in a direction opposite to the direction thereof in state 1. Current Id2 that increases linearly from time t4 to t5 is excitation current–Im.

In state 5 (time t5 to t6), the voltage generated across the drive winding T4 causes the capacitor C12 to be charged via the resistor R12, so that a voltage across the capacitor C12 reaches a threshold voltage (for example, about 0.6 V) of the transistor Tr2. The transistor Tr2 is thus turned on and, at time t5, the switching element Q2 is turned off. As a result, a reverse voltage is applied to the secondary-side rectifying element Ds, so that the secondary winding T2 of the transformer T and the capacitor Cs resonate with each other and the capacitor Cs is charged. At the primary side, the primary winding T1 of the transformer T and the inductor L resonate with the capacitors C1 and C2, so that the capacitor C1 is discharged and the capacitor C2 is charged. When voltage Vds1 across the capacitor C1 drops to zero voltage, the diode D1 goes into conduction. At this point, the first delay circuit 3, which includes the capacitor C3 and the resistor R3, causes a voltage generated across the drive winding T3 to be applied to the control terminal of the switching element Q1 with a short delay from the voltage generation. At time t6, the switching element Q1 is turned on, thereby achieving a zero-voltage switching operation, and state 5 ends. During that period, at the secondary side, voltage Vs across the capacitor Cs increases from zero voltage, and is clamped to the sum of the secondary winding voltage and the output voltage.

At rated load, the operations described above are performed in one switching cycle, and similar operations are performed in the next switching cycle. Thereafter, those operations are repeated.

In the switching power supply circuit described above, since the switching elements Q1 and Q2 are turned on at zero voltage and the switching element Q2 is also turned off at near zero current, switching loss is significantly reduced. Additionally, the secondary-side rectifying element Ds is turned on at zero current. Concurrently, the current waveform thereof exhibits a relatively sharp rise from zero current, reaches a peak point at which the rate of current change becomes zero, and returns to a point of zero current at which the rectifying element Ds is turned off. Thus, the waveform of current flowing through the rectifying element Ds becomes a substantially rectangular shape, so that the peak current can be kept low. This can reduce the effective value of current and also reduce conduction loss. Thus, these effects lead to high efficiency.

Meanwhile, at rated load, no signal is input to the light-load-time signal input terminal S. Thus, the transistor Tr30 is in the OFF state, and the phototransistor PC2 in the second impedance circuit 20 is in the OFF state.

(2) At Light Load

Operations when a light load is detected will now be described.

Figure 3:
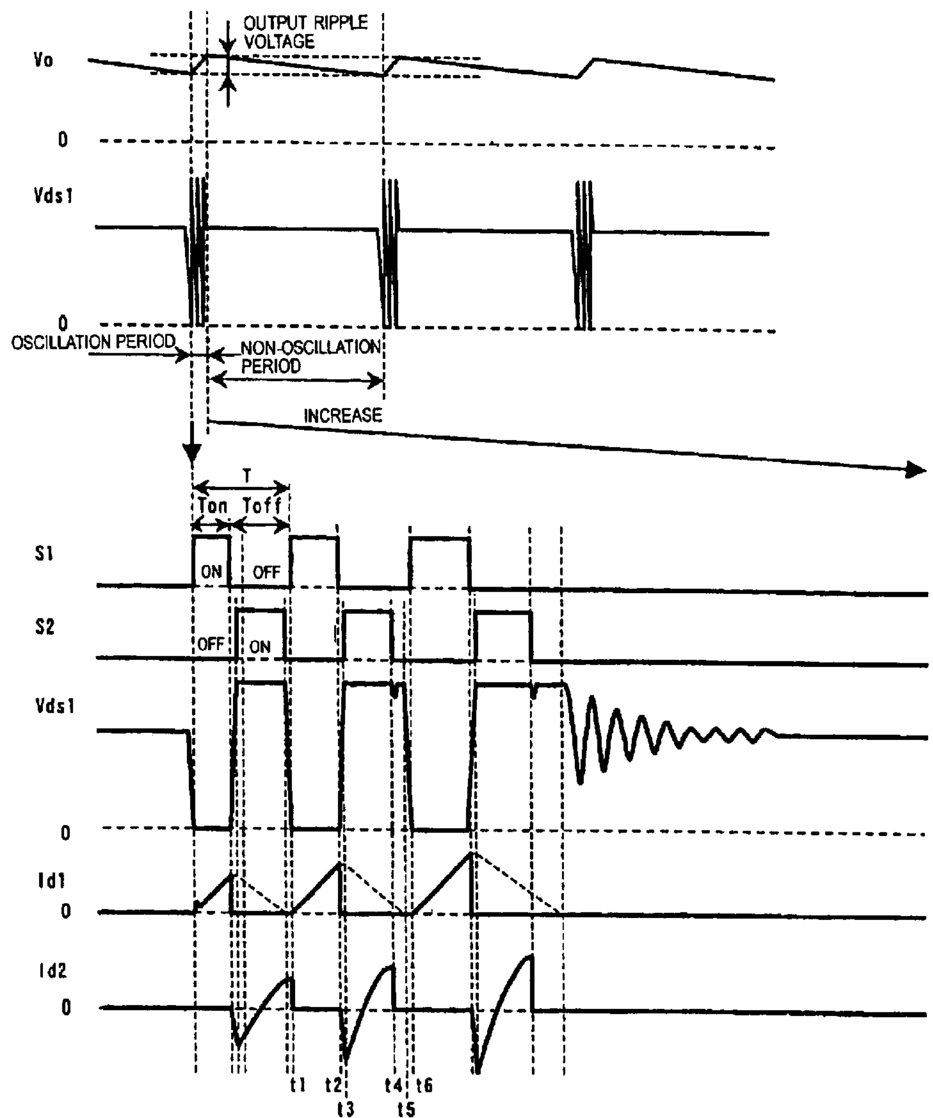
FIG. 3 is a waveform diagram of an intermittent oscillation operation.

FIG. 3 is a waveform diagram illustrating operations when a light load is detected.

When a signal voltage (light-load detection signal) is applied to the terminal S during detection of a light load, the transistor Tr30 is turned on to cause the photodiode PC2 to go into conduction, thereby turning on the phototransistor PC2. This causes current to flow through the phototransistor PC2, the resistor R14, and the diode D14, so that the charging time of the capacitor C12 is reduced and thus the ON-time of the second switching element Q2 is reduced. In this case, the time constant of the second impedance circuit 20 is set such that the ON-time of the switching element Q2 becomes shorter than reset time Tr in which excitation energy stored during the ON-time is released from the secondary side.

Operations from time t1 to t4 are analogous to the operations at rated load shown in FIG. 2, and a description will be made starting from state 4 since timing at time t4 is different from that of known operations.

In state 4 (time t4 to t5), the ON-time of the switching element Q2 is set to be shorter than reset time Tr. Thus, a voltage generated across the drive winding T4 causes the capacitor C12 to be charged via the resistors R12 and R14, and the voltage across the capacitor C12 reaches the threshold (for example, about 0.6 V) of the transistor Tr2, so that the transistor Tr2 is turned on. Thus, at time t4, the switching element Q2 is turned off. At this point, since energy is not completely released from the secondary side, the conduction state of the rectifying element Ds continues and no voltage reversal occurs across the transformer T. When the energy is completely released from the secondary side at time t5, the cycle proceeds to state 5.

In state 5 (time t5 to t6), when the energy release from the secondary side is completed at time t5 and a reverse voltage is applied to the rectifying element Ds of the secondary side, the voltage across the transformer T begins to reverse. Then, the secondary winding T2 of the transformer T and the capacitor Cs resonate with each other, thereby charging the capacitor Cs. At the primary side, the primary winding T1 of the transformer T and the inductor L resonate with the capacitors C1 and C2, so that the capacitor C1 is discharged and the capacitor C2 is charged. Voltage Vds1 across the capacitor C1 drops to near zero voltage. At this point, the first delay circuit 3, which includes the capacitor C3 and the resistor R3, causes a voltage generated across the drive winding T3 to be applied to the control terminal of the switching element Q1 with a short delay from the voltage generation. At time t6, the first switching element Q1 is turned on, and state 5 ends. During that period, at the secondary side, voltage Vs across the capacitor Cs increases from zero voltage, and is clamped to the sum of the secondary winding voltage and the output voltage.

The operations described above are performed in one switching cycle, and similar operations are performed in the next switching cycle. Thereafter, those operations are repeated.

(3) Intermittent Oscillation Operation at Light Load

An intermittent oscillation operation is performed due to a variation in the time constant of the second impedance circuit 20 and a change in the time constant of the first impedance circuit 10.

The first impedance circuit 10 is preferably configured as follows.

At rated or heavy load, after the first switching element Q1 is turned on due to a voltage generated across the first drive winding T3, the transistor Tr1 is brought into conduction to turn off the first switching element Q1.

Meanwhile, during detection of a light load, before the first switching element Q1 is turned on due to a voltage generated across the first drive winding T3, the first control transistor Tr1 is brought into conduction. This prevents the first switching element Q1 to be turned on, and the time constant varies so that the oscillation is stopped.

At light load, the time constants of the first and second impedance circuits 10 and 20 are changed as described above, and an intermittent oscillation operation is performed with the following mechanism.

Referring to FIG. 1, time from the generation of a voltage across the drive winding T3, application of the voltage to the control terminal of the switching element Q1 by the first delay circuit 3, to the turning on of the switching element Q1 by reaching a threshold voltage will be referred to as delay time Ta. Further, a time from after the voltage is generated across the drive winding T3, and current flows through the phototransistor PC1 and the resistor R4 to charge the capacitor C4, to a time when the base potential of the transistor Tr1 reaches the threshold voltage (for example, about 0.6 V) will be referred to as time Tb.

At light load, when output voltage Vo increases to cause the impedance of the phototransistor PC1 to be reduced, time Tb is reduced. Since delay time Ta is substantially constant regardless of a load, an increase in output voltage to a predetermined value causes time Tb to become shorter than time Ta, so that the transistor Tr1 is brought into conduction before the switching element Q1 is turned on. As a result, the gate potential of the switching element Q1 does not increase, and thus the voltage generated across the drive winding T3 does not cause the switching element Q1 to be turned on. As a result, the switching operation is temporarily stopped. Then, electrical charge stored in the capacitor C4 is discharged to thereby cause the transistor Tr1 to be turned off again. After a certain time, current flowing into the switching element Q1 via the start-up resistor R1 causes the switching element Q1 to be turned on, thereby starting the switching operation again. By the time the switching operation is started due to the current flowing into the switching element Q1 via the start-up resistor R1, the output voltage has been temporarily reduced. Thus, the switching operation is performed continuously for a certain period. Thereafter, the output voltage again increases, and when the output voltage reaches a predetermined voltage, another non oscillation operation is caused. In this case, the start-up time in which the switching element Q1 is turned on due to the current flowing through the start up resistor R1 is sufficiently long compared to the time in which the switching element Q1 is turned on due to the voltage generated across the drive winding T3. As a result, the switching element Q1 performs an intermittent switching operation in which the consecutive switching period and the non-switching period are cyclically repeated.

In this manner, the first preferred embodiment can achieve an intermittent switching operation, in which the continuation and stopping of a switching operation are cyclically repeated, at light load, with a small number of components. In addition, performing such an intermittent switching operation allows for a significant reduction in power loss, such as a switching loss, and also allows for a reduction in heat generation in switching elements. Additionally, the first preferred embodiment can achieve such an operation with a simple configuration, which thus can provide a switching power supply circuit having improved efficiency and a reduced size at a low cost.

In addition, since a voltage surge, which is generated when the switching element Q1 is turned off in the known circuit, is absorbed and clamped by the capacitor C, no voltage surge is generated in preferred embodiments of the present invention. This allows for a reduction in switching loss and allows the use of a low-voltage switching element that is small in ON-resistance. Thus, the switching power supply unit of the first preferred embodiment can reduce conduction loss and thus can achieve an improved efficiency in power supply. Also, an appropriate setting of the first ON-time control circuit allows switching, at light load, between intermittent oscillation and continuous oscillation by only turning on and off the phototransistor PC2. Furthermore, the cycle of the intermittent oscillation can be arbitrarily set by adjusting, for example, the start-up time of the switching power supply circuit or a gain due to feedback by the photocoupler PC1. This can prevent or reduce the generation of sound from the switching power supply circuit due to the intermittent switching cycle entering an audible-frequency region, and can reduce ripple voltage.

Figure 4:
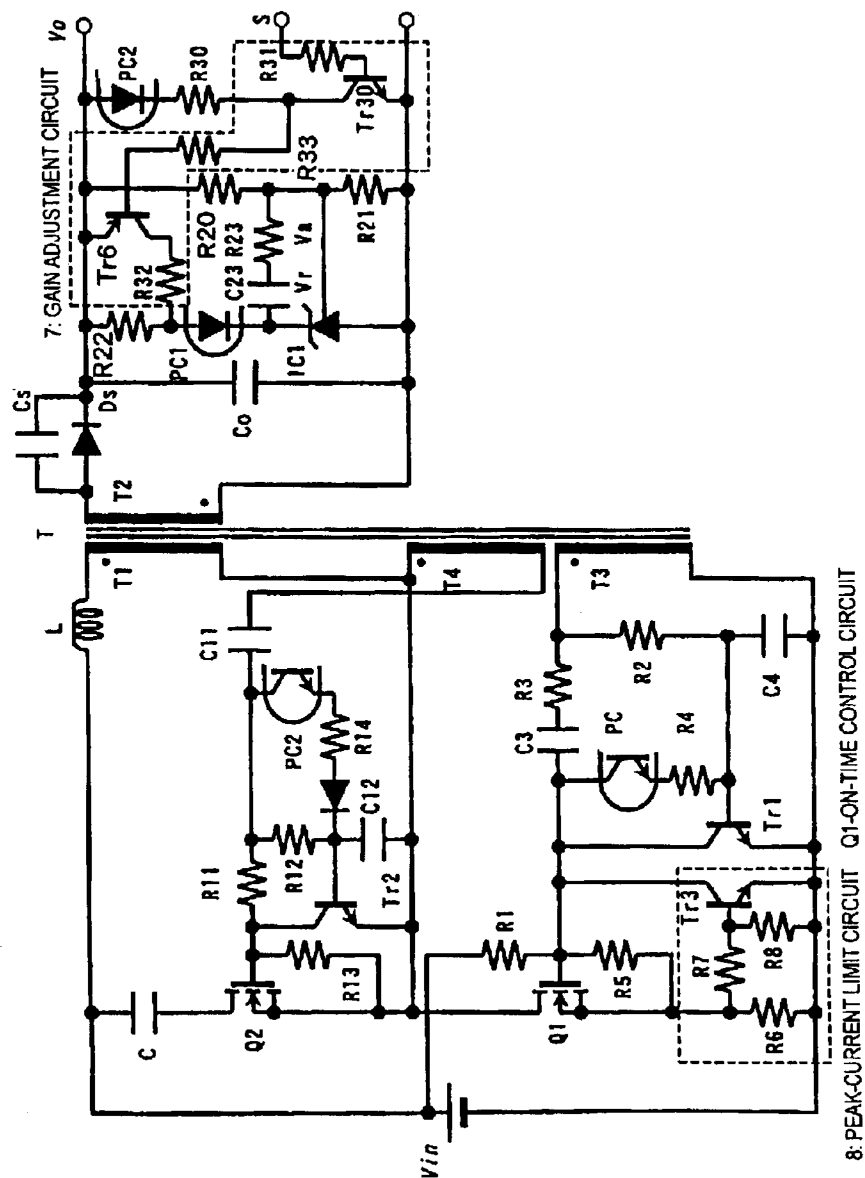
FIG. 4 is a circuit diagram of a second preferred embodiment of the present invention.

FIG. 4 shows a switching power supply unit according to a second preferred embodiment of the present invention.

The switching power supply unit of the second preferred embodiment further includes a gain adjustment circuit 7 and a peak-current limit circuit 8 in the switching power supply unit of the first preferred embodiment which is shown in FIG. 1.

The gain adjustment circuit 7 has a configuration in which a resistor R32 is connected in parallel with a resistor R22 in the output stabilization circuit 5 via a transistor Tr6, a control terminal (base) of which is connected via a resistor R33 to the collector of the transistor Tr30 in the Q2-ON-time switching circuit 6. With this arrangement, a light-load detection signal input from the terminal S brings the transistor Tr6 into conduction, thereby increasing a change in current flowing through the photodiode PC1. This means an increase in the gain due to feedback from the output stabilization circuit 5 to the primary side of the transformer T.

The arrangement described above can reduce ripple voltage during intermittent oscillation. The description thereof will now be given with reference to FIG. 5.

During continuous oscillation of the switching power supply circuit, an output ripple voltage is small due to the absence of a non-oscillation period. Meanwhile, during an intermittent switching operation, the output voltage increases in an oscillation period and decreases in a non-oscillation period, which poses a problem in that a ripple in the output voltage becomes large in an intermittent oscillation cycle.

Accordingly, when a change in current flowing through the photodiode PC1 is increased during intermittent oscillation to cause the gain to increase, the ripple voltage can be reduced due to improved sensitivity to a small fluctuation in output voltage. During continuous oscillation at rated or heavy load, a large amount of current flows in the circuit, and an abnormal oscillation operation may occur when the gain is high. It is therefore desirable to have a high gain during intermittent oscillation and to have a low gain during continuous oscillation.

Figure 5:
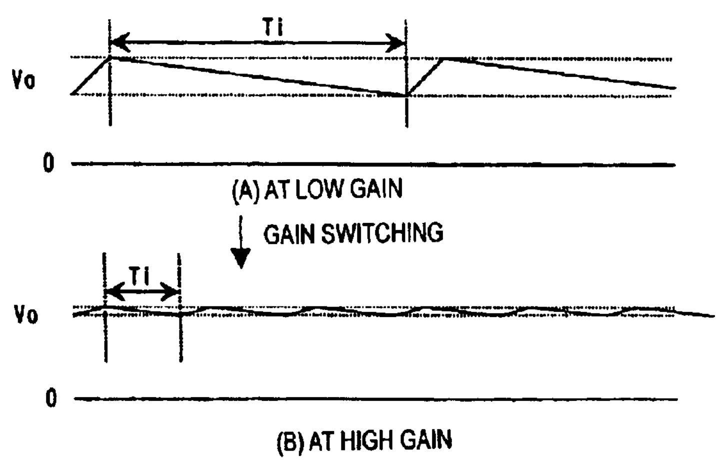
FIG. 5 is a diagram illustrating the operation of a gain adjustment circuit.

In this preferred embodiment, the switching is performed such that the value of the resistor that is connected in series with the photodiode PC1 is reduced during intermittent oscillation to increase the gain and such that the value of the resistor is increased during continuous oscillation to reduce the gain. This allows for a reduction in ripple voltage during intermittent oscillation, as shown in FIG. 5.

The peak-current limit circuit 8 includes resistors R6, R7, and R8, and a transistor Tr3. The resistor R6 functions as a current detecting device and is connected in series with the first switching element Q1, and the resistors R7 and R8 divide a voltage (which is proportional to current Id1) across the resistor R6. A voltage generated across the resistor R8 is applied to the base terminal of the transistor Tr3, and the collector terminal thereof is connected to the control terminal (gate) of the first switching element Q1.

Figure 6A:
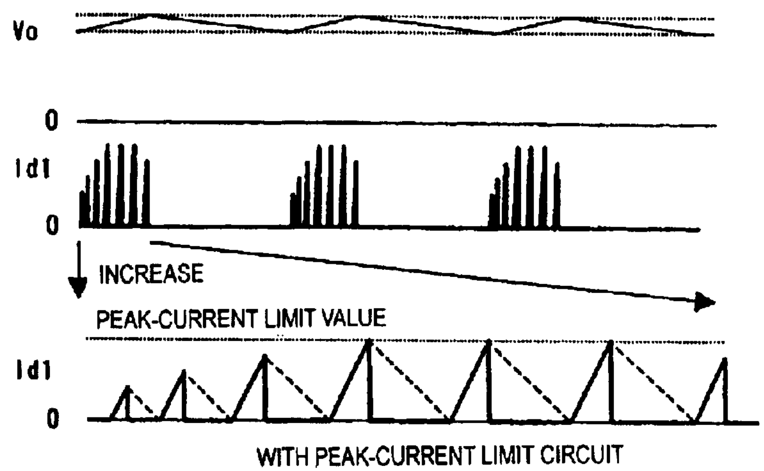
FIGS. 6A and 6B are diagrams illustrating the difference of operational waveforms in the presence and absence of a peak-current limit circuit.
Figure 6B:
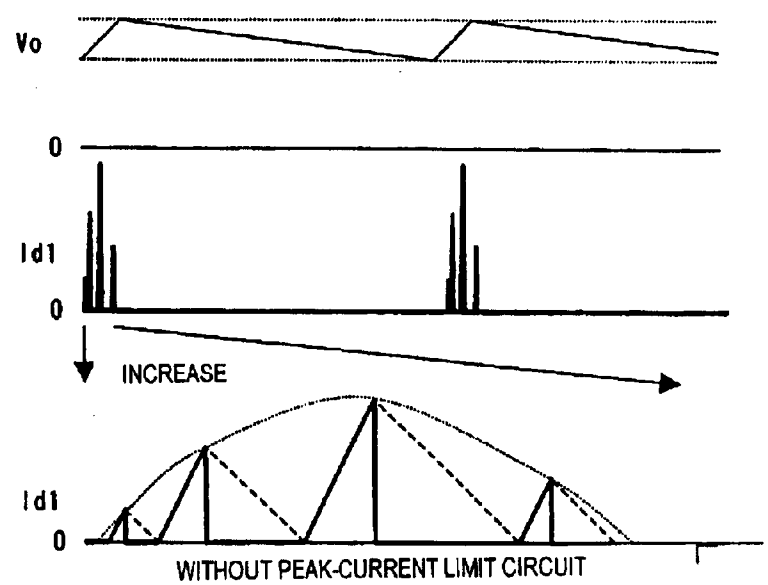

The operation of the peak-current limit circuit 8 will now be described. FIG. 6A is an operational waveform diagram in the presence of the peak-current limit circuit 8. For comparison, FIG. 6B is an operation waveform diagram in the absence of the peak-current limit circuit 8.

During an intermittent switching operation of the switching power supply circuit, the output voltage is reduced in a non-oscillation period and thus the output voltage is increased in the next oscillation period. Thus, the ON-time is extended and current in the primary winding increases. Also, when the input voltage is low, an allowance for saturation in the transformer is reduced due to a further increase in current in the primary winding. Thus, in some cases, the switching power supply unit is damaged or broken due to a saturation phenomenon. Additionally, when current in the primary winding is increased, switching loss is increased to thereby cause an increase in energy per pulse. Thus, the number of oscillation pulses during an oscillation period is reduced and the intermittence period is extended. Thus, there is a problem in that an output ripple voltage is increased.

Accordingly, the peak-current limit circuit 8 is provided to limit the peak value of current in the primary winding. Thus, the peak-current limit circuit 8 limits the peak current value even when current in the primary winding is increased, and inhibits the saturation in the transformer. Additionally, a reduction in current peak value allows for a reduction in switching loss when the first switching element Q1 is turned off, and an increase in the number of oscillation pulses in an oscillation period causes the cycle of an intermittent oscillation to be shortened, thereby allowing for a reduction in ripple voltage.

Figure 7:
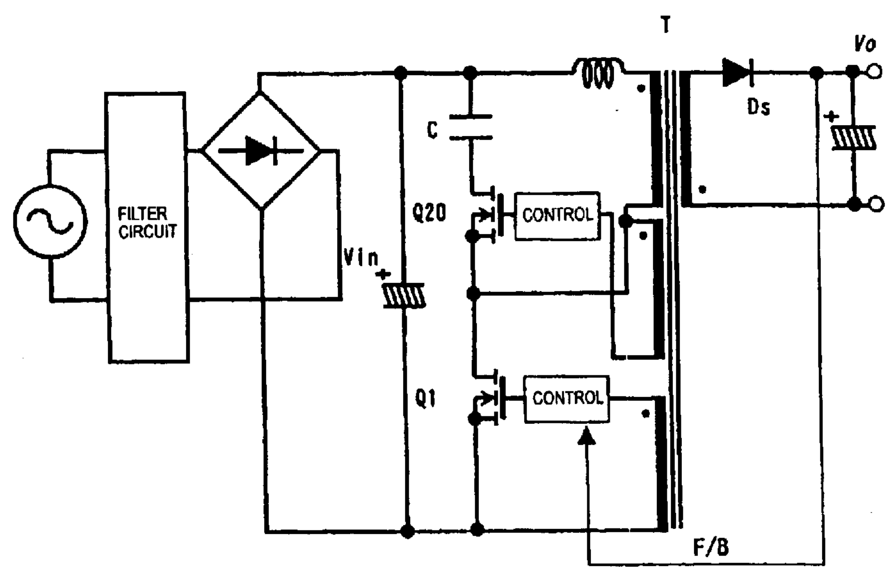
FIG. 7 is a circuit diagram of a third preferred embodiment of the present invention.

FIG. 7 shows a preferred embodiment when a commercial power supply is used at the input. The commercial power supply is rectified and smoothed to provide a DC voltage Vin.

Figure 8:
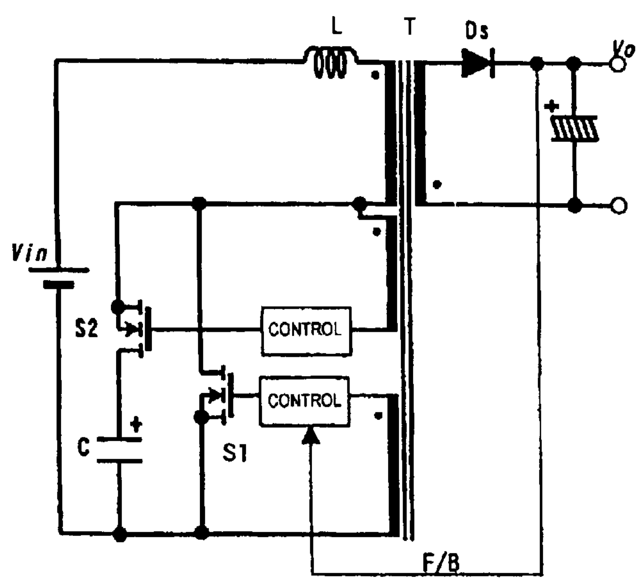
FIG. 8 is a circuit diagram of a fourth preferred embodiment of the present invention.

FIG. 8 shows another preferred embodiment of the present invention. In this preferred embodiment, a series circuit of the second switching circuit S2 and the capacitor C is connected in parallel with the first switching circuit S1. While a voltage applied to the capacitor C in this arrangement becomes large compared to the first preferred embodiment, the circuit operation and the advantages are substantially the same as in the first preferred embodiment.

Figure 9:
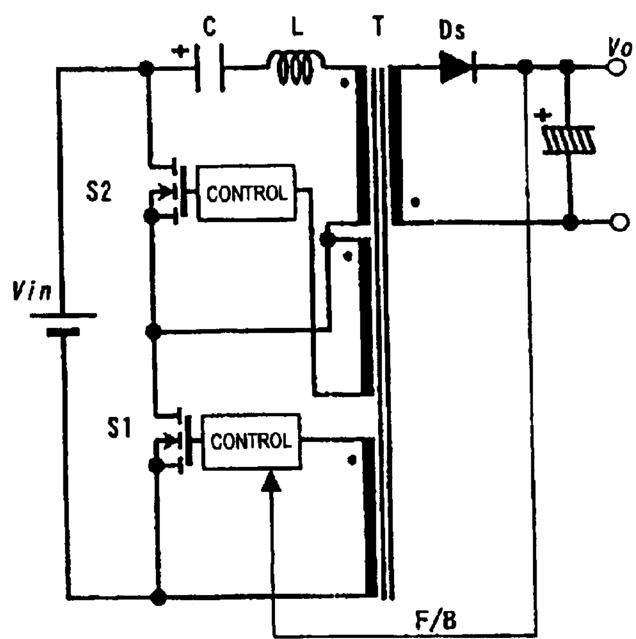
FIG. 9 is a circuit diagram of a fifth preferred embodiment of the present invention.
Figure 10:
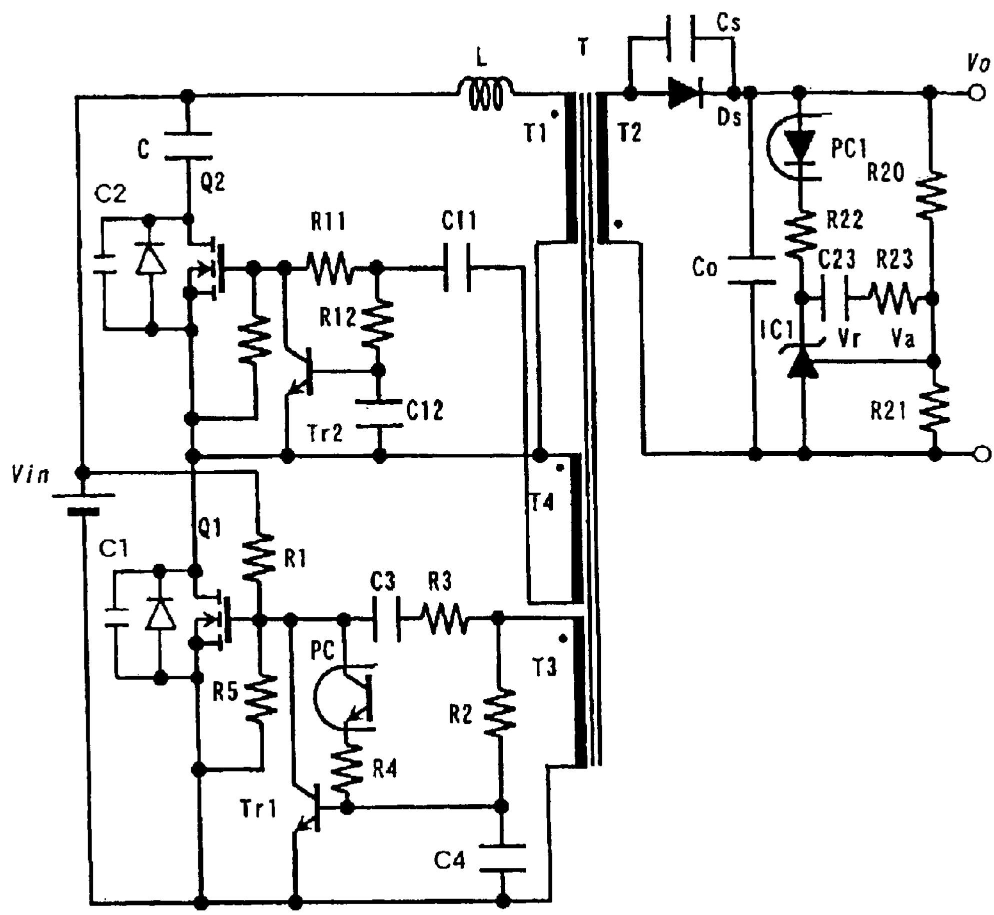
FIG. 10 is a circuit diagram of the related art.
Figure 11:
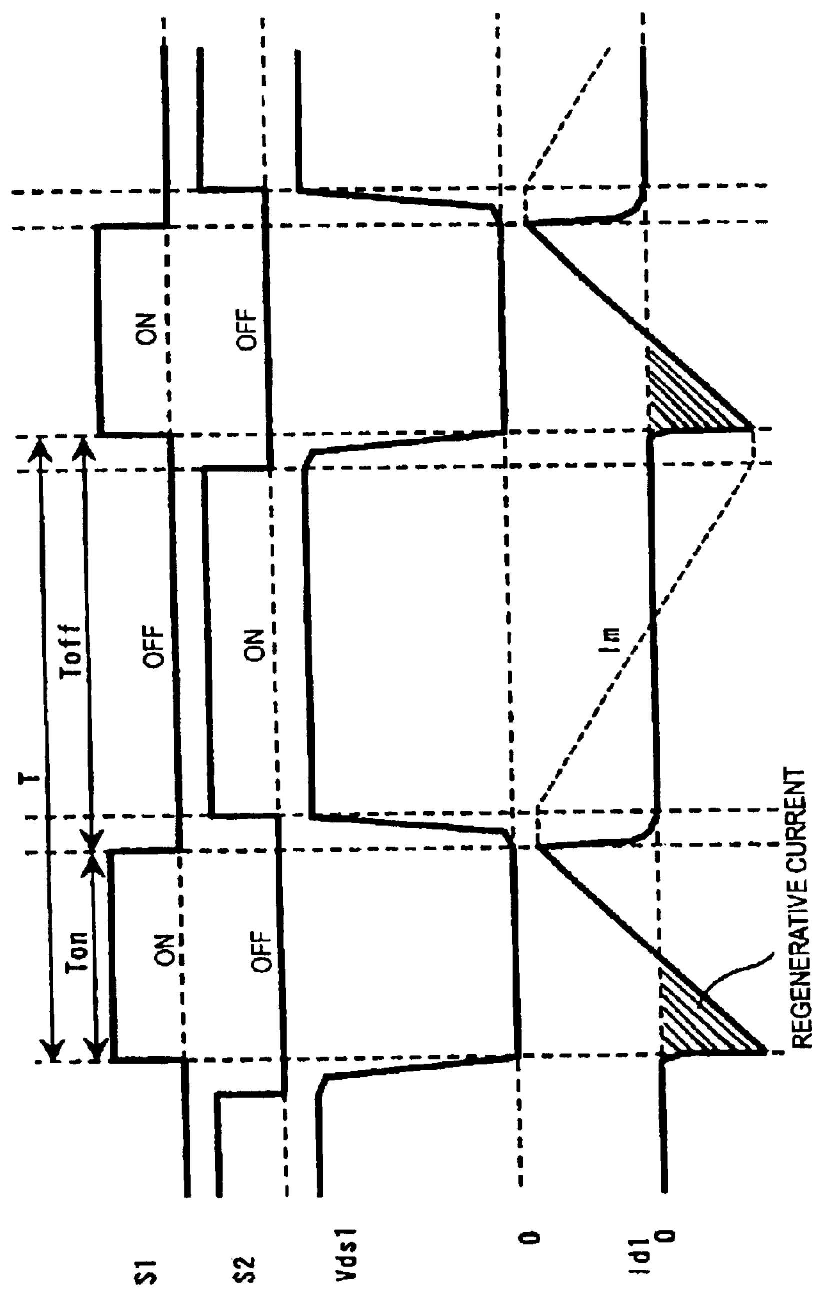
FIG. 11 is a waveform diagram illustrating operations at light load.
Figure 12:
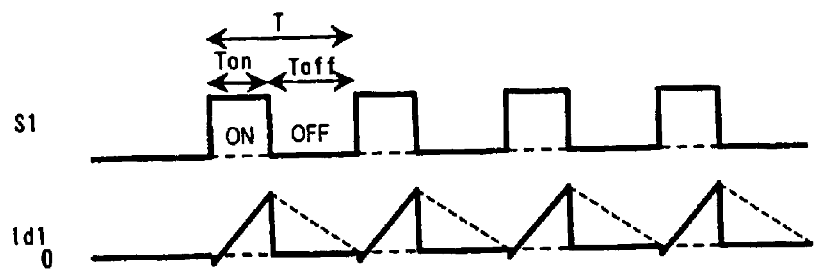
FIG. 12 is a waveform diagram illustrating operations at light load.
Figure 13:
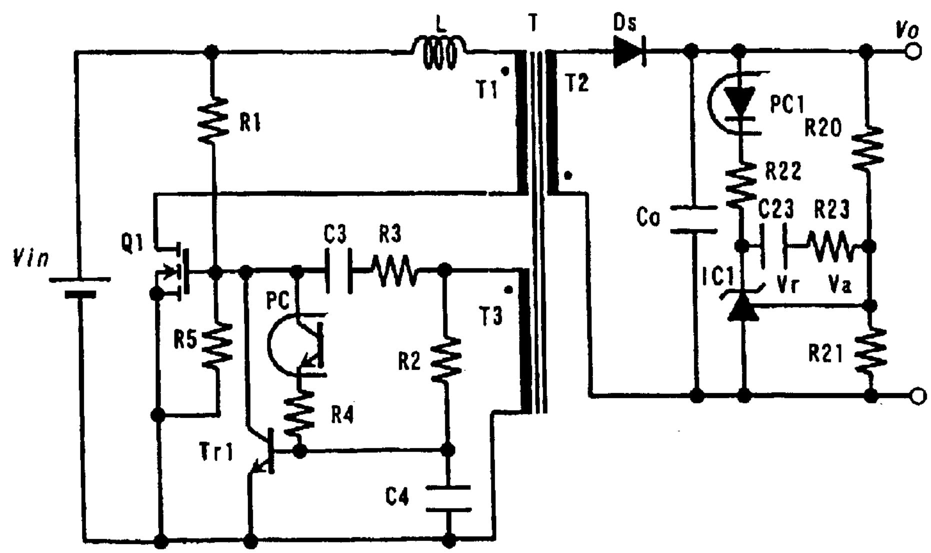
FIG. 13 is a circuit diagram of another power supply unit of the related art.
Figure 14:
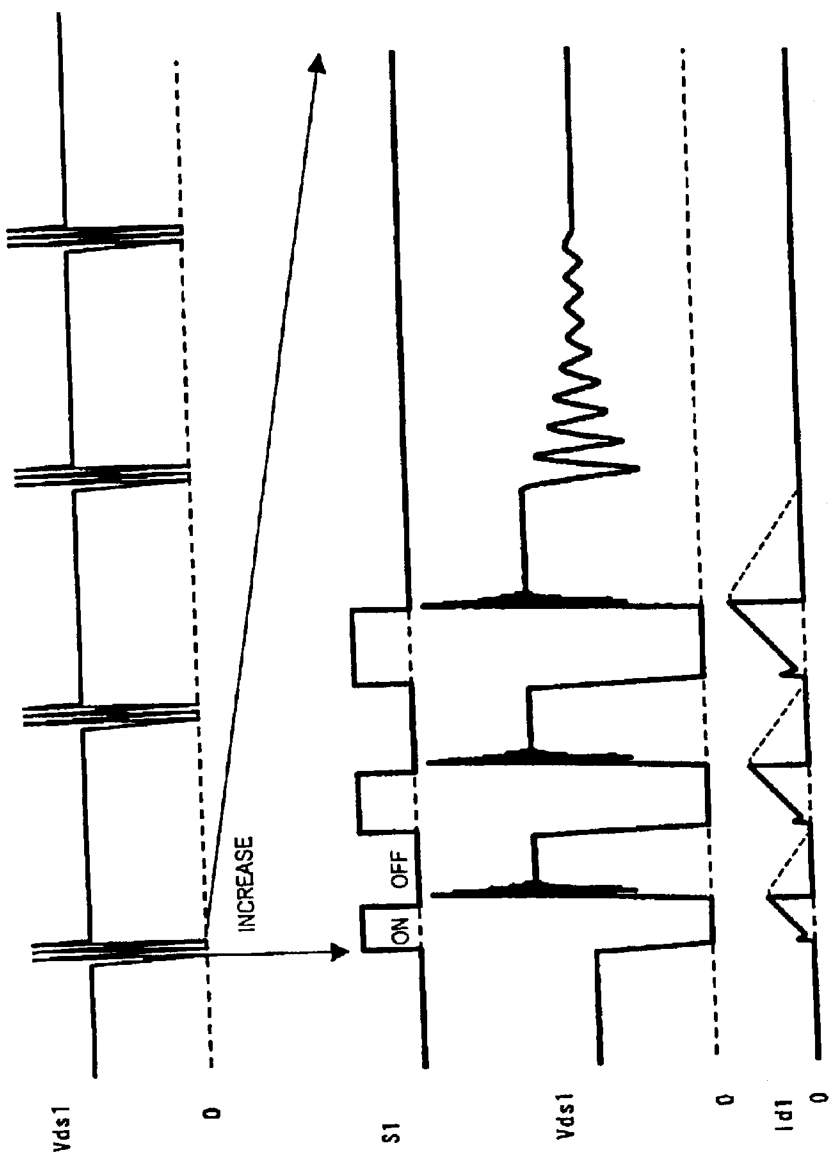
FIG. 14 is a waveform diagram illustrating operations during intermittent oscillation.

FIG. 9 shows yet another preferred embodiment of the present invention. In this preferred embodiment, the capacitor C is connected in series with the primary winding of the transformer T. With this arrangement, a voltage applied to the first and second switching circuits S1 and S2 becomes substantially equal to an input voltage. This results in a low voltage stress compared to the first preferred embodiment, and the circuit operation and the advantages are substantially the same as in the first preferred embodiment.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A switching power supply unit comprising:

a first switching circuit including a first switching element, a first diode, and a first capacitor, which are connected in parallel with each other;

a second switching circuit including a second switching element, a second diode, and a second capacitor, which are connected in parallel with each other;

a capacitor that is connected in series with the second switching element to define a series circuit, the series circuit being connected to one end of the first switching circuit;

a transformer including a primary winding, a secondary winding that is provided with a rectifying/smoothing circuit, a first drive winding, and a second drive winding, wherein the first drive winding generates a voltage for bringing the first switching element into conduction and the second drive winding generates a voltage for driving the second switching element;

a switching control circuit that controls an ON-time of the first switching element by alternately turning on and off the first and second switching elements with a period in which the first and second switching elements are both turned off therebetween, thereby controlling stabilization of an output voltage; and an input power supply; wherein the first switching circuit, the transformer, and the input power supply are connected in series with each other;

the switching power supply unit performs self-excitation oscillation by storing energy in the primary winding of the transformer in a period in which the first switching element is turned on and by releasing energy from the secondary winding of the transformer in a period in which the first switching element is turned off;

the switching control circuit includes a first switching control circuit which includes a first ON-time control circuit and which is connected between a control terminal of the first switching element and the first drive winding, and a second switching control circuit which includes a second ON-time control circuit and which is connected between a control terminal of the second switching element and the second drive winding;

wherein, when the output voltage reaches a predetermined value at light load, the first ON-time control circuit prevents a voltage generated across the first drive winding from turning on the first switching element to thereby stop oscillation, and, at rated load or heavy load, the first ON-time control circuit allows a voltage generated across the first drive winding to turn on the first switching element, thereby controlling the On-time of the first switching element;

the second ON-time control circuit controls an ON-time of the second switching element such that energy release from the secondary winding is completed after the end of the ON-time of the second switching element; and the switching power supply unit performs an intermittent oscillation operation, in which an oscillation period and non-oscillation period are alternately repeated, at light load.

2. A switching power supply unit according to claim 1, wherein the first switching control circuit includes a first delay circuit for determining a delay time from when a voltage is generated across the first drive winding until when the first switching element is turned on, and the first ON-time control circuit includes a first control transistor which is connected to the control terminal of the first switching element, and a first time-constant circuit which is connected to a control terminal of the first control transistor and which includes a first impedance circuit and a capacitor; and wherein the first ON-time control circuit controls the On-time of the first switching element, the ON-time thereof being time from when the first switching element is turned on until when the first control transistor goes into conduction, by changing the impedance of the first impedance circuit in such a manner that, at light load, the time constant of the first time constant circuit is changed to be shorter than the time constant of the first delay circuit such that the first control transistor is brought into conduction before the first switching element is turned on, to prevent a voltage generated across the first drive winding from turning on the first switching element and to thereby stop oscillation, and in such a manner that, at rated or heavy load, the time constant of the first time-constant circuit is changed to be longer than the time constant of the first delay circuit such that the ON-time of the first switching element is controlled, thereby performing a stabilization operation for the output voltage.

3. A switching power supply unit according to claim 1, wherein the second ON-time control circuit includes a second control transistor which is connected to the control terminal of the second switching element, and a second time-constant circuit which is connected to a control terminal of the second control transistor and which includes an impedance circuit and a capacitor; and the second ON-time control circuit controls the ON-time of the second switching element by changing the impedance of the second impedance circuit in such a manner that, at light load, the time constant of the second time-constant circuit is changed to be short, such that energy release from the secondary winding is completed after the end of the ON-time of the second switching element, and in such a manner that, at rated or heavy load, the time constant of the second time constant circuit is changed to be long, such that the ON-time of the second switching element Q2 ends after energy release from the secondary winding is completed.

4. A switching power supply unit according to claim 1, wherein a series circuit including the second switching circuit and a capacitor is connected in parallel with the first switching circuit.

5. A switching power supply unit according to claim 1, wherein a photocoupler is used for changing an impedance of at least one of the first and second impedance circuits.

6. A switching power supply unit according to claim 5, further comprising an output-voltage stabilization circuit, wherein the output-voltage stabilization circuit detects an output voltage and, in response to the detected voltage, causes the photocoupler to feed back a signal for changing the impedance of the first impedance circuit to the switching control circuit, thereby stabilizing the output voltage, and the output-voltage stabilization circuit is provided with a gain adjustment circuit, the photocoupler includes a photodiode that is connected series with a resistor, and the gain adjustment circuit reduces the resistance of the resistor to thereby increase a feedback gain of the photocoupler.

7. A switching power supply unit according to claim 1, further comprising a peak-current limit circuit, the peak current-limit circuit having a current detecting device that is connected in series with the first switching element, wherein the current detecting device detects a primary current flowing through the first switching element and the peak-current limit circuit turns off the first switching element when the primary current reaches a predetermined peak.

8. A switching power supply unit according to claim 1, wherein at least one of the first and second switching elements includes a field effect transistor.

9. A switching power supply unit according to claim 1, wherein a capacitor C is connected in series with the primary winding of the transformer such that a voltage applied to the first and second switching circuits becomes substantially equal to an input voltage.

10. A switching power supply unit according to claim 1, wherein the input power supply is a commercial power supply.

11. A switching power supply unit comprising:

a first switching circuit including a first switching element, a first diode, and a first capacitor, which are connected in parallel with each other;

a second switching circuit including a second switching element, a second diode, and a second capacitor, which are connected in parallel with each other;

a capacitor that is connected in series with the second switching element to provide a series circuit, the series circuit being connected to one end of the first switching circuit;

a transformer including a primary winding, a secondary winding that is provided with a rectifying/smoothing circuit, a first drive winding, and a second drive winding, wherein the first drive winding generates a voltage for bringing the first switching element into conduction and the second drive winding generates a voltage for driving the second switching element;

a switching control circuit that alternately turns on and off the first and second switching elements with a period in which the first and second switching elements are both turned off therebetween; and an input power supply; wherein the first switching circuit, the transformer, and the input power supply are connected in series with each other;

the switching power supply unit performs self-excitation oscillation by storing energy in the primary winding of the transformer in a period in which the first switching element is turned on and by releasing energy from the secondary winding of the transformer in a period in which the first switching element is turned off;

the switching control circuit includes a first switching control circuit which includes a first delay circuit, a first control element, and a first impedance circuit and which is connected between the first switching element and the first drive winding, and a second switching control circuit which includes a second impedance circuit and which is connected between the second switching element and the second drive winding;

wherein, during detection of a light load, the impedance of the second impedance circuit varies to cause the time constant thereof to change such that the ON-time of the second switching element becomes shorter than the ON-time thereof at rated load and energy release from the secondary winding is completed after the end of the ON-time of the second switching element;

the first delay circuit determines a time from when a voltage is generated across the first drive winding until when the voltage generated across the first drive winding causes the first switching element to be turned on;

the first control element is driven for forcibly turning off the first switching element or for preventing the first switching element from turning on;

the impedance of the first impedance circuit varies to cause the time constant thereof to change in such a manner that, at rated or heavy load other than during detection of a light load, after a voltage generated across the first drive winding causes the first switching element to be turned on, the first control element is driven to cause the first switching element to be turned off, and in such a manner that, at light load, the impedance of the second impedance circuit in the second switching control varies to cause the time constant thereof to change, and at the same time, the first control element is driven to prevent the first switching element from being turned on before a voltage generated across the first drive winding causes the first switching element to be turned on; and during detection of a light load, the switching power supply unit performs an intermittent oscillation operation, in which an oscillation period and a non-oscillation period are alternately repeated due to a change in time constant resulting from impedance changes in the first and second impedance circuits.

12. A switching power supply unit according to claim 11, wherein the first switching control circuit includes a first delay circuit for determining a delay time from when a voltage is generated across the first drive winding until when the first switching element is turned on, and the first ON-time control circuit includes a first control transistor which is connected to the control terminal of the first switching element, and a first time-constant circuit which is connected to a control terminal of the first control transistor and which includes a first impedance circuit and a capacitor; and wherein the first ON-time control circuit controls the On-time of the first switching element, the ON-time thereof being time from when the first switching element is turned on until when the first control transistor goes into conduction, by changing the impedance of the first impedance circuit in such a manner that, at light load, the time constant of the first time constant circuit is changed to be shorter than the time constant of the first delay circuit such that the first control transistor is brought into conduction before the first switching element is turned on, to prevent a voltage generated across the first drive winding from turning on the first switching element and to thereby stop oscillation, and in such a manner that, at rated or heavy load, the time constant of the first time-constant circuit is changed to be longer than the time constant of the first delay circuit such that the ON-time of the first switching element is controlled, thereby performing a stabilization operation for the output voltage.

13. A switching power supply unit according to claim 11, wherein the second ON-time control circuit includes a second control transistor which is connected to the control terminal of the second switching element, and a second time-constant circuit which is connected to a control terminal of the second control transistor and which includes an impedance circuit and a capacitor; and the second ON-time control circuit controls the ON-time of the second switching element by changing the impedance of the second impedance circuit in such a manner that, at light load, the time constant of the second time-constant circuit is changed to be short, such that energy release from the secondary winding is completed after the end of the ON-time of the second switching element, and in such a manner that, at rated or heavy load, the time constant of the second time constant circuit is changed to be long, such that the ON-time of the second switching element Q2 ends after energy release from the secondary winding is completed.

14. A switching power supply unit according to claim 11, wherein a series circuit including the second switching circuit and a capacitor is connected in parallel with the first switching circuit.

15. A switching power supply unit according to claim 11, wherein a photocoupler is used for changing an impedance of at least one of the first and second impedance circuits.

16. A switching power supply unit according to claim 15, further comprising an output-voltage stabilization circuit, wherein the output-voltage stabilization circuit detects an output voltage and, in response to the detected voltage, causes the photocoupler to feed back a signal for changing the impedance of the first impedance circuit to the switching control circuit, thereby stabilizing the output voltage, and the output-voltage stabilization circuit is provided with a gain adjustment circuit, the photocoupler includes a photodiode that is connected series with a resistor, and the gain adjustment circuit reduces the resistance of the resistor to thereby increase a feedback gain of the photocoupler.

17. A switching power supply unit according to claim 11, further comprising a peak-current limit circuit, the peak current-limit circuit having a current detecting device that is connected in series with the first switching element, wherein the current detecting device detects a primary current flowing through the first switching element and the peak-current limit circuit turns off the first switching element when the primary current reaches a predetermined peak.

18. A switching power supply unit according to claim 11, wherein at least one of the first and second switching elements includes a field effect transistor.

19. A switching power supply unit according to claim 11, wherein a capacitor C is connected in series with the primary winding of the transformer such that a voltage applied to the first and second switching circuits becomes substantially equal to an input voltage.

20. A switching power supply unit according to claim 11, wherein the input power supply is a commercial power supply.

* * * * *